US010740737B2

(12) United States Patent
Pareek

(10) Patent No.: US 10,740,737 B2
(45) Date of Patent: Aug. 11, 2020

(54) METHOD FOR MANAGING FUNDS TRANSFERAL

(71) Applicant: MASTERCARD INTERNATIONAL INCORPORATED, Purchase, NY (US)

(72) Inventor: Ravi Pareek, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 295 days.

(21) Appl. No.: 15/677,843

(22) Filed: Aug. 15, 2017

(65) Prior Publication Data
US 2018/0060840 A1 Mar. 1, 2018
US 2018/0247285 A9 Aug. 30, 2018

(30) Foreign Application Priority Data

Aug. 25, 2016 (SG) .......................... 10201607113X

(51) Int. Cl.
| G06Q 20/36 | (2012.01) |
| G06Q 20/40 | (2012.01) |
| G06Q 20/10 | (2012.01) |
| G06Q 20/04 | (2012.01) |
| G06Q 20/32 | (2012.01) |

(52) U.S. Cl.
CPC .......... *G06Q 20/105* (2013.01); *G06Q 20/04* (2013.01); *G06Q 20/322* (2013.01); *G06Q 20/363* (2013.01); *G06Q 20/40* (2013.01)

(58) Field of Classification Search
CPC ....... G06Q 20/40; G06Q 20/04; G06Q 20/105
USPC .......................................................... 705/41
See application file for complete search history.

(56) References Cited

U.S. PATENT DOCUMENTS

| 8,417,633 B1* | 4/2013 | Chmara ............... G06Q 20/202 705/14.1 |
| 8,442,914 B2 | 5/2013 | Killian et al. |
| 8,700,525 B1 | 4/2014 | Rafferty et al. |
| 9,691,055 B2 | 6/2017 | Von Behren et al. |
| 9,704,143 B2 | 7/2017 | Walker et al. |
| 2012/0253913 A1 | 10/2012 | Richard |
| 2013/0282588 A1* | 10/2013 | Hruska .................. G06Q 20/10 705/67 |

(Continued)

OTHER PUBLICATIONS

PCT International Search Report and Written Opinion, Application No. PCT/US2017/043665, dated Oct. 12, 2017, 12 pps.

*Primary Examiner* — Hai Tran
(74) *Attorney, Agent, or Firm* — Armstrong Teasdale LLP

(57) ABSTRACT

A method for managing funds is provided. The method includes receiving a payment vehicle identifier by which a payment vehicle can be identified, the payment vehicle includes an available account balance, transaction details of a purchase transaction, and the transaction details, sending a first amount that is less than or equal to the transaction value if the transaction value does not exceed the available account balance, and sending a second amount that is less than or equal to the first amount. The transaction details include a transaction value, a merchant identifier of a merchant with whom the purchase transaction is being made, and a merchant wallet identifier by which a merchant virtual wallet can be identified, the merchant virtual wallet being associated with the merchant identifier.

20 Claims, 5 Drawing Sheets

(56) References Cited

U.S. PATENT DOCUMENTS

2013/0339253 A1* 12/2013 Sincai ................ G06Q 20/3227
  705/71
2016/0247149 A1    8/2016 Postrel
2016/0292680 A1   10/2016 Wilson et al.
2017/0154329 A1    6/2017 Babu et al.

* cited by examiner

METHOD FOR MANAGING FUNDS TRANSFERAL

CROSS REFERENCE TO RELATED APPLICATIONS

This patent application claims priority to Singapore Application No. SG 10201607113X, filed on Aug. 25, 2016, the disclosure of which is incorporated by reference herein in its entirety as part of the present application.

BACKGROUND

The present disclosure relates to methods for managing funds transferals and, in particular, funds transferals involving virtual wallets.

There are presently many methods for performing financial transactions such as purchase transactions. One recently developed method involves the use of digital or virtual wallets. Even though virtual wallets have only been available for a short period of time, their adoption rate has been rapid at least in part due to the penetration of smartphones that provide the platform from which most virtual wallets operate.

However, various virtual wallets are incompatible with each other, such that transfers between wallets are prevented. Also, virtual wallets are often only useable online.

BRIEF DESCRIPTION

The present disclosure provides a method for managing funds transferal, including receiving, at a settlement engine, a payment vehicle identifier by which a payment vehicle can be identified, the payment vehicle including an available account balance, transaction details of a purchase transaction, the transaction details including a transaction value, and a merchant identifier of a merchant with whom the purchase transaction is being made, and a merchant wallet identifier by which a merchant virtual wallet can be identified, the merchant virtual wallet being associated with the merchant identifier, sending from the payment vehicle to the settlement engine a first amount that is less than or equal to the transaction value, if the transaction value does not exceed the available account balance, and sending from the settlement engine to the merchant virtual wallet a second amount that is less than or equal to the first amount.

The present disclosure further provides a computer system for managing funds transferal, the computer system including a settlement engine, the settlement engine including a memory device for storing data, a display, and a processor coupled to the memory device and being configured to receive a payment vehicle identifier by which a payment vehicle can be identified, the payment vehicle including an available account balance, receive transaction details of a purchase transaction, the transaction details including, a transaction value, and a merchant identifier of a merchant with whom the purchase transaction is being made, and receive a merchant wallet identifier by which a merchant virtual wallet can be identified, the merchant virtual wallet being associated with the merchant identifier, receive, from the payment vehicle, a first amount that is less than or equal to the transaction value, if the transaction value does not exceed the available account balance, and send to the merchant virtual wallet a second amount that is less than or equal to the first amount.

BRIEF DESCRIPTION OF THE DRAWINGS

Some non-limiting exemplary embodiments will now be described with reference to the drawings in which.

DETAILED DESCRIPTION

Figure 1:
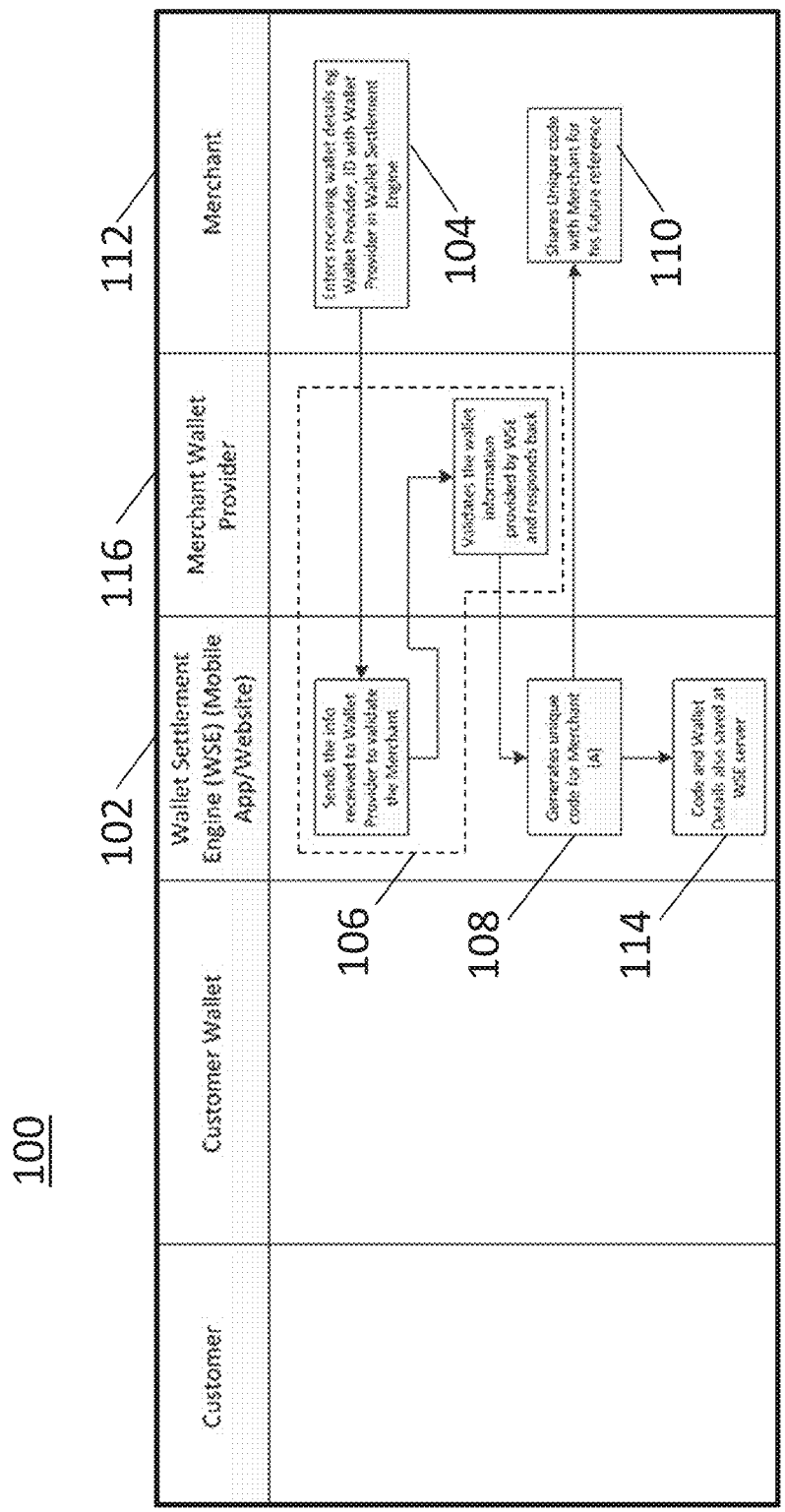
FIG. 1 illustrates a method for registering for an account with a wallet settlement engine.

Embodiments of the present disclosure will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "retrieving", "authorizing", "issuing", "offering" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may include a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIG. 1 shows a method 100 for registering for an account with a wallet settlement engine (WSE) 102. The method 100 includes:

Step 104: providing merchant details;
Step 106: validating merchant details;
Step 108: generating merchant identifier;
Step 110: sending merchant identifier to merchant 112; and
Step 114: storing merchant identifier.

The method 100 facilitates registration of a merchant 112 with a WSE 102 so that the merchant 112 can transact using accounts created with the WSE 102.

To start the process, the merchant 112 supplies various merchant details to the WSE 102 so that the WSE 102 can identify a virtual wallet provider 116 with whom the merchant 112 holds a virtual wallet account—step 104. The details may be the name or other identifier of the virtual wallet provider 116, the account number of the merchant's virtual wallet account or an identifier registered with the virtual wallet provider 116 and identifying the merchant.

The merchant 112 sends the merchant details to the WSE 102. For example, the merchant details may be sent through an online portal or webpage hosted by or associated with the WSE 102. The details may alternatively be sent through an app hosted by or associated with the WSE 102.

The WSE 102 then forwards the merchant details to the virtual wallet provider 116. The virtual wallet provider 116 validates the merchant details to ensure the merchant 112 is the party requesting the creation of the account with the WSE 102—step 106. For example, the virtual wallet provider 116 may send to a smartphone associated with the merchant 112 a short message service (SMS) message containing a unique code for entry into the webpage, portal or app through which the merchant details were sent to the WSE 102.

Upon entry of the unique code, the unique code is sent to the WSE 102 and is then forwarded to the virtual wallet provider 116. If the virtual wallet provider 116 can match the unique code with the unique code sent to the smartphone of the merchant 112 (i.e. the correct code has been entered by the merchant 112) then the virtual wallet provider 116 advises the WSE 102 of validation of the merchant 112.

Once the merchant is validated, the WSE 102 generates a unique merchant identifier or unique merchant code by which the merchant is identified in the WSE servers—step 108. The unique merchant identifier can be entered by customers of the merchant when making purchase transactions, thereby enabling the WSE 102 to match the purchase transactions to the particular merchant with whom the transactions are being made.

The WSE 102 also creates a wallet settlement account and associates that account with the unique merchant identifier. The wallet settlement account may also be associated with the virtual wallet details entered by the merchant 112 when initiating registration with the WSE 102. Thus transfers of funds from the wallet settlement account can be consistently made to the same virtual wallet (i.e. the merchant virtual wallet).

The unique merchant identifier may be a random number or an algorithmically generated unique number. The unique merchant identifier may alternatively be the account number of the wallet settlement account established for the merchant 112.

The unique merchant identifier is sent to the merchant 112, for example by SMS or email—step 110. This enables the merchant 112 to supply the unique merchant identifier to customers in order for transactions to be made through the WSE 102.

The WSE 102 also therefore stores the unique merchant identifier along with the virtual wallet details of the merchant 112—step 114. In practice, the WSE 102 will store all details necessary for making transactions between the merchant's wallet settlement account and the merchant's virtual wallet, and for contacting the merchant 112 and performing other functions unrelated to funds transferal—for example, supplying advertising and deals (e.g. discounts on usage costs of WSE functions).

Once the unique merchant identifier has been generated, shared with the merchant 112 and stored by the WSE 102, the merchant 112 is registered with the WSE 102. The merchant 112 can therefore use the WSE 102 to make funds transferals such as during purchase transactions initiated by customers of the merchant 112.

Figure 2:
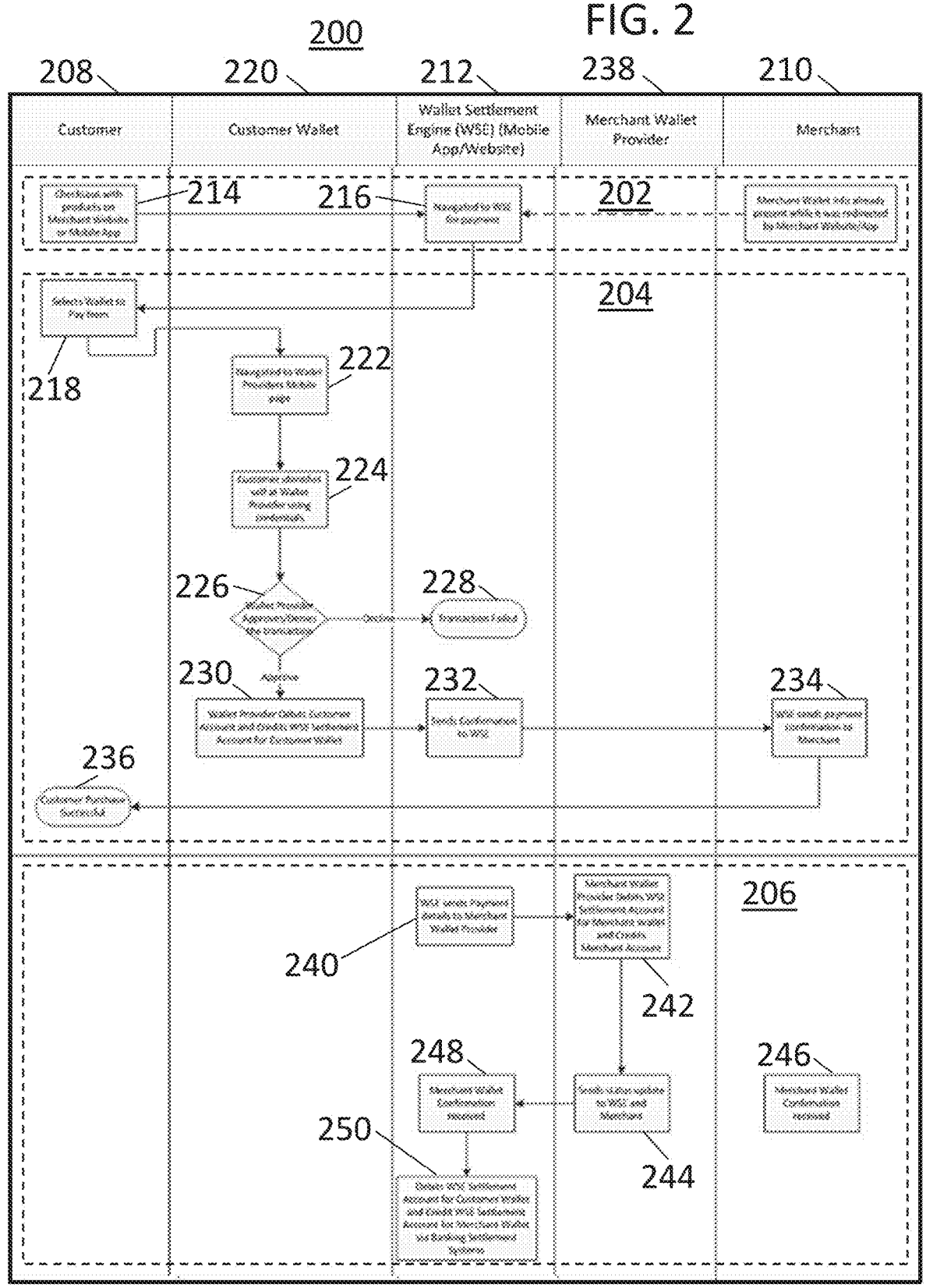
FIG. 2 illustrates a method for managing funds transferal from a customer in accordance with present teachings.

FIG. 2 shows a method 200 for managing funds transferal. The method 200 broadly includes:

Step 202: receiving details at a settlement engine;
Step 204: sending funds from a payment vehicle; and
Step 206: sending funds to a merchant virtual wallet.

The method 200 operates during a purchase transaction when, for example, a customer 208 selects products or services for purchase form the merchant 210. In the present method, the customer 208 uses a payment vehicle (e.g. credit card, debit card, bank account or other payment vehicle) to make the purchase transaction. While a payment vehicle may be used on its own in the present methods, a customer virtual wallet is used in the present illustrative example, the customer virtual wallet including the payment vehicle.

The method involves the settlement engine or WSE 212 receiving various details to establish and define the transaction—step 202. The details include a payment vehicle identifier by which the payment vehicle can be identified. As previously mentioned, the customer is using a virtual wallet including the payment vehicle, such that the payment vehicle identifier is presently the customer wallet identifier by which the customer wallet can be identified—these will hereinafter be referred to as a customer wallet identifier and the customer's virtual wallet. The details also include transaction details of the purchase transaction. The transaction details consist of whatever is needed by the WSE 212 to manage settlement of the purchase transaction, and presently include the transaction value (i.e. the value of the basket or total value of goods and services being purchased, along with any taxes and other relevant fees) and the unique merchant identifier. The unique merchant identifier identifies the merchant with whom the purchase transaction is being made, and thereby enables the WSE 212 to match the purchase transaction with the merchant 210.

In addition to the first virtual wallet identifier of the first virtual wallet (i.e. the customer wallet identifier of the customer virtual wallet), the WSE 212 also receives a second wallet identifier by which a second virtual wallet can be identified—the second wallet identifier and second virtual wallet are those of the merchant and will hereinafter be referred to as the merchant's wallet identifier and merchant's virtual wallet. It will be appreciated that, upon registration of the merchant with the WSE 212, using the method 100 of FIG. 1, the second wallet identifier will already be known to the WSE 212 in advance of future transactions.

The WSE 212 may receive the transaction details and merchant wallet identifier from various sources. For example, the purchase transaction may take place using an online payment portal. In such a case the client fills their basket with the products (e.g. goods and services) they wish to purchase and proceeds to checkout—step 214. The transaction details and merchant wallet identifier may be supplied to the WSE 212 by the payment portal—step 216. Supply of these details may be made when finalizing a purchase transaction or during input of details necessary to complete the purchase process. For example, the transaction details and merchant wallet identifier may be sent while the customer is inputting or confirming address details for delivery of goods purchase by the purchase transaction.

The online payment portal may be a merchant website or merchant app hosted by the merchant 210, a merchant aggregator website or app or another online platform through which goods or services can be purchased from the merchant 210. In each case, the WSE 212 will receive the transaction details, and merchant wallet identifier from the website or app.

After receipt of the information by the WSE 212, the customer selects the virtual wallet from which to debit funds to pay for the transaction—step 218. Alternatively, a default wallet may be automatically selected or where the customer has a single virtual wallet that single virtual wallet may be automatically selected.

The process then undergoes a standard authentication process involving navigation to the authentication page of the wallet provider 220—step 222—identification or authentication of the customer—step 224—and approval or declination of the transaction—step 226. If the customer 208 fails authentication or has insufficient funds in the relevant wallet account to fulfil the transaction, the wallet provider 220 declines the transaction—step 228.

Provided the available account balance in the account associated with the virtual wallet is at least the transaction value, a first amount of funds is sent from the first virtual wallet (i.e. the customer virtual wallet) to the settlement engine. The first amount is less than or equal to the transaction value. While the first amount of funds will typically be the same as the transaction value, it may be less than the transaction value where fees are deducted from the transaction value by the wallet provider or another party.

In one embodiment, if the customer is authenticated and has sufficient funds then funds are transferred by the WSE 212 directly from the customer account associated with the virtual wallet, to a merchant account associated with a merchant's virtual wallet. In the embodiment shown in FIG. 2, if the customer is authenticated and has sufficient funds, the wallet provider 220 debits the customer account associated with the digital wallet and credits the debited funds to a customer settlement account managed by the WSE 212—step 230.

The customer settlement account may be pre-established in a similar manner to banking or other financial accounts. The customer settlement account may alternatively be dynamically created to temporarily holds funds for a particular transaction, and then removed or deleted after the funds have been transferred from it (e.g. to the merchant 210). In either case, when the customer settlement account is created it is associated with the first digital wallet, namely the digital wallet of the customer based on the identifier of that wallet.

Once the funds have been credited to the customer settlement account, the customer wallet provider 220 sends payment confirmation to the WSE 212 to confirm that payment has been made—step 232.

The WSE 212 may similarly send payment confirmation to the merchant 210—step 234. This advises the merchant 210 that the goods and/or services have been paid for and can be delivered or performed.

After sending payment confirmation to the merchant 210, the transaction successfully completes—step 236.

Figure 3:
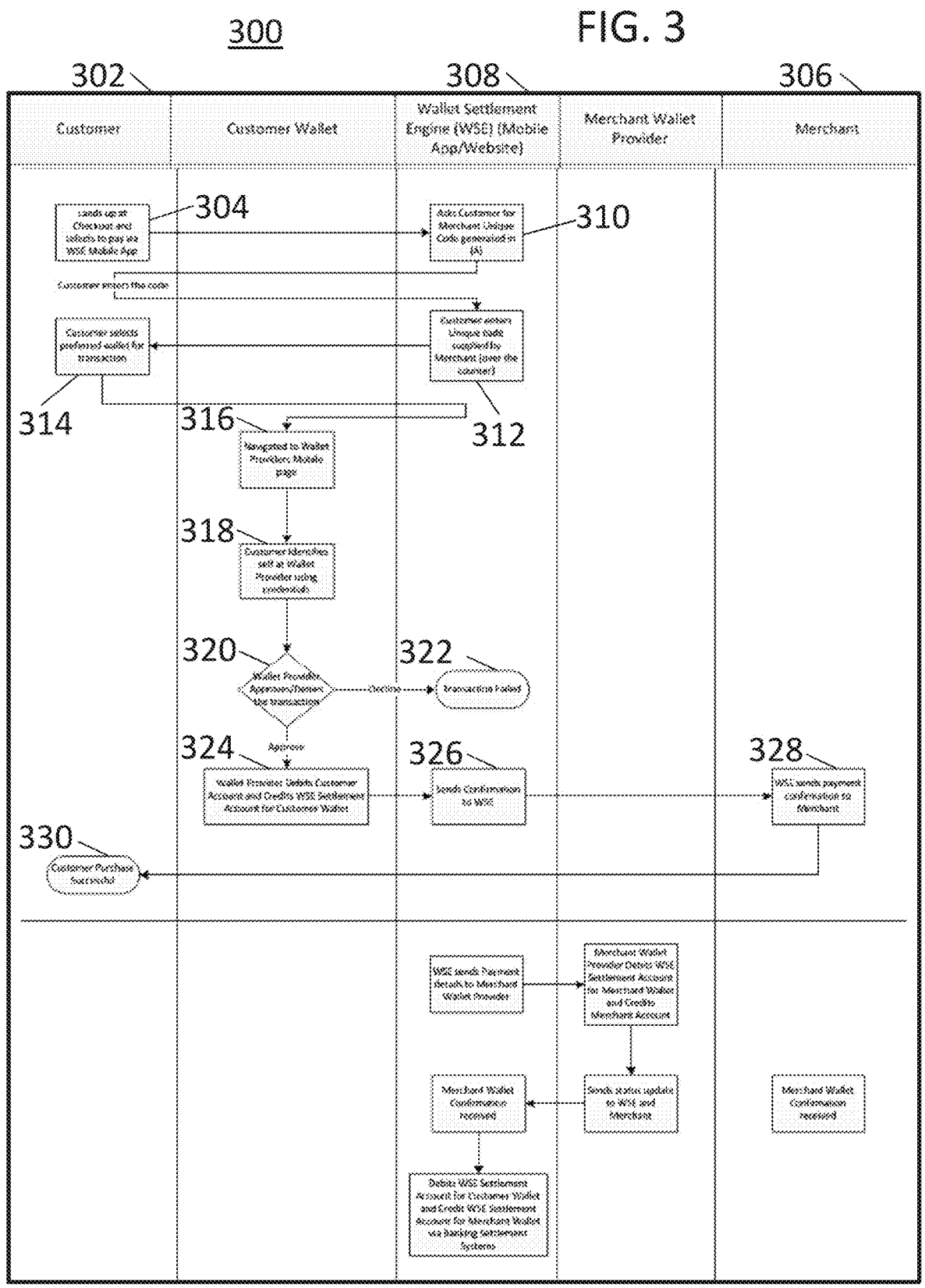
FIG. 3 illustrates a method for managing funds transferal from a customer in accordance with present teachings.

FIG. 3 illustrates a method 300 for managing funds transferal in which the purchase transaction takes place in-store. In such circumstances the customer 302 arrives at checkout with their basket for purchase—step 304. The merchant 306 then supplies their unique merchant identifier—generated in accordance with step 108—to the customer 304 at checkout. The merchant identifier may be supplied verbally, written down for the customer to read, delivered through a readable device such as a quick response (QR) code or barcode, automatically determined based on location (e.g. using the GPS on a smartphone on which the customer would otherwise enter the merchant identifier if delivered verbally), or may be found on the merchant's website.

The WSE 308 then receives the merchant identifier—step 312. Where the merchant identifier is not automatically delivered to the customer 302, the WSE 308 prompts the customer to enter the merchant identifier—step 310. The customer 302 may enter the merchant identifier via manual input—for example, the customer 302 may enter the merchant identifier into an app (e.g. on the customer's smartphone or other device carried by the customer) or web portal hosted by the merchant 306 or associated with the merchant 306. The customer 302 may alternatively have the merchant identifier entered automatically—for example where the merchant identifier is determined based on location. The WSE 308 therefore receives the merchant identifier through the smartphone interface, whether or not that merchant identifier is manually or automatically entered.

The merchant identifier enables the WSE 308 to locate the merchant wallet details, or merchant settlement account (discussed with reference to FIG. 4) for completion of funds transferal to the merchant.

The customer's wallet identifier may be supplied in the same manner as the transaction details and merchant wallet identifier. However, in some situations the customer 302 may have multiple virtual wallets and need to make a selection of the wallet from which the funds for purchase should be debited—step 314. In this situation, after initiating the purchase transaction the customer 302 will select the customer's virtual wallet to be used in the purchase transaction. The WSE 308 may then receive the customer's wallet identifier from the wallet provider 316 that issued the customer's virtual wallet.

Steps 316 to 330 are the same as for steps 222 to 236 of method 200, and therefore need not be repeated.

As mentioned with reference to FIG. 2, funds may be transferred directly from the customer's virtual wallet to the merchant's virtual wallet. However, in broad step 206, the WSE 212 operates as an intermediary during funds transferal.

Once funds have been received into the customer's wallet settlement account per step 230, the WSE 212 transfers funds from the customer's wallet settlement account to the merchant's wallet settlement. While the first amount of funds—for example, the amount transferred from the customer's virtual wallet to the WSE 212—may be the same as the second amount of funds—for example words the amount transferred from the WSE 212 to the merchant's virtual wallet—it will be appreciated that fees will often be deducted from the purchase amount such that the second amount is less than the first amount. Similarly, a third amount—the amount transferred from the customer's settlement account to the merchant's settlement account—will be equal to or less than the first amount and equal to or greater than the second amount.

Once funds are in the merchant's settlement account, the WSE 212 sends payment receipt confirmation to the merchant's wallet provider 238—step 240. This alerts the merchant's wallet provider that funds are available for collection. The merchant's wallet provider 238 then debits the merchant's wallet settlement account and credits the merchant's virtual wallet account—step 242. Once credited, the merchant's wallet provider 238 sends payment confirmation to both the WSE 212 and merchant 210—step 244. The confirmation may be received by the merchant—step 246—before or after supply of the goods or services to the customer 208.

Upon receipt of the payment confirmation at the WSE 212—step 248—the WSE may delete the merchant settlement account if that account was set up for the specific transaction. This illustrates that there is significant flexibility in using the WSE 212 to manage interaction between the customer's virtual wallet and the merchant's virtual wallet. In particular, in one embodiment funds are transferred directly from the customer's virtual wallet via the WSE 212 to the merchant's virtual wallet. In another embodiment, a single wallet settlement account is set up for the particular transaction (e.g. by mapping the settlement account to the transaction receipt number), funds from the customer's virtual wallet are credited that the single wallet settlement account and funds from the single wallet settlement account are then credited to the merchant's virtual wallet account. In this case, the single wallet settlement account may be considered the customer's settlement account but also the merchant's settlement account. In a further embodiment, the customer and merchant have separate settlement accounts—this embodiment is discussed in relation to FIGS. 1-3.

Figure 4:
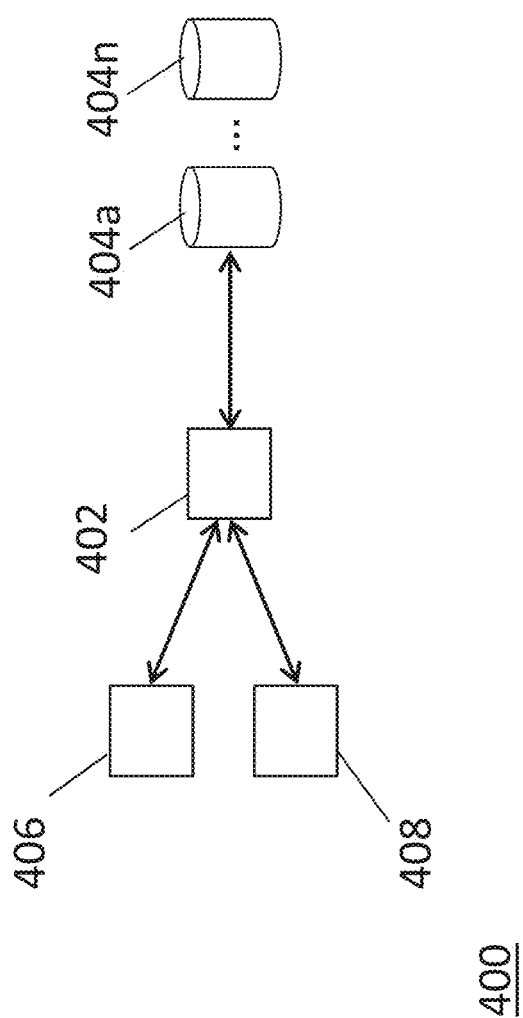
FIG. 4 shows a schematic of a system for facilitating dispensing fuel into a vehicle according to present teachings.

FIG. 4 shows a schematic of a network-based system 400 for managing funds transferal according to an embodiment of the disclosure. The system 400 includes a computer 402—for example, a WSE, one or more databases 404a . . . 404n—for example, for storing settlement accounts and related information, a user input module 406—for example, a customer wallet provider server, and a user output module 408—for example a merchant wallet provider server.

Each of the one or more databases 404a . . . 404n is communicatively coupled with the computer 402. The user input module 406 and a user output module 408 may be separate and distinct modules communicatively coupled with the computer 402. Alternatively, the user input module 406 and a user output module 408 may be integrated within a single mobile electronic device (e.g. a mobile phone, a tablet computer, etc.). The mobile electronic device may have appropriate communication modules for wireless communication with the computer 402 via existing communication protocols.

The computer 402 may include at least one processor, and at least one memory including computer program code. The at least one memory and the computer program code are configured to, with at least one processor, cause the computer at least to: (A) receive a first wallet identifier by which a first virtual wallet can be identified, the first virtual wallet including an available account balance, receive transaction details of a purchase transaction, the transaction details including a transaction value, and a merchant identifier of a merchant with whom the purchase transaction is being made, receive a second wallet identifier by which a second virtual wallet can be identified, the second virtual wallet being associated with the merchant identifier, send from the first virtual wallet to the settlement engine a first amount that is less than or equal to the transaction value, if the transaction value does not exceed the available account balance; and send from the settlement engine to the second virtual wallet a second amount that is less than or equal to the first amount.

The various types of data (e.g. transaction details, first and second wallet identifiers, merchant identifier, transaction completion or failure, wallet settlement account details, payment receipt confirmations) can be stored in a single database (e.g. 404a), or stored in multiple databases (e.g. wallet settlement account details may be stored in database 404a, transaction details may be stored in database 404n, etc.). The databases 404a . . . 404n may be realized using cloud computing storage modules and/or dedicated servers communicatively coupled with the computer 402.

Figure 5:
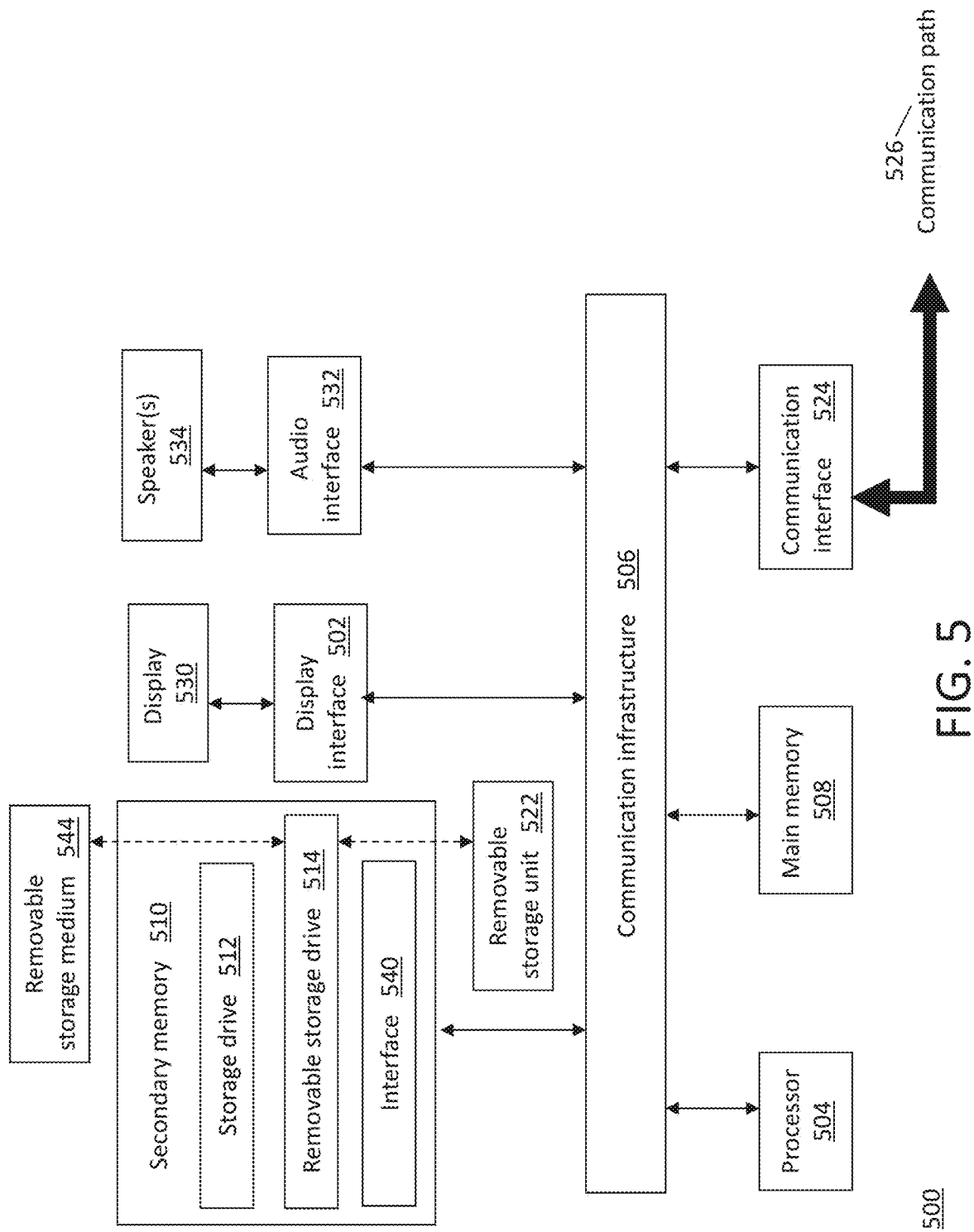
FIG. 5 shows an exemplary computing device suitable for executing the method for facilitating dispensing fuel into a vehicle according to present teachings.

FIG. 5 depicts an exemplary computing device 500, such as a computer, hereinafter interchangeably referred to as a computer system 500, where one or more such computing devices 500 may be used to facilitate execution of the above-described method for managing funds transferal. In addition, one or more components of the computer system 500 may be used to realize the computer 402. The following description of the computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 544 in a well-known manner. The removable storage medium 544 may include magnetic tape, optical disk, non-volatile memory storage medium, or the like, which is read by and written to by removable storage drive 514. As will be appreciated by persons skilled in the relevant art(s), the removable storage medium 544 includes a computer readable storage medium having stored therein computer executable program code instructions and/or data.

In an alternative embodiment, the secondary memory 510 may additionally or alternatively include other similar means for allowing computer programs or other instructions to be loaded into the computing device 500. Such means can include, for example, a removable storage unit 522 and an interface 540. Examples of a removable storage unit 522 and interface 540 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 540 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the disclosures, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port (such as a serial, parallel, printer, GPIB, IEEE 1393, RJ35, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage medium 544, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 500. Examples of transitory or non-tangible computer readable transmission media that may also participate in the provision of software, application programs, instructions and/or data to the computing device 1100 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the storage drive 512, or the interface 540. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. A method for managing funds transferal, the method implemented by a wallet settlement engine (WSE) comprising at least one processor in communication with a database, the WSE in communication with at least one customer wallet provider associated with a customer and a smartphone associated with the customer the method comprising:
   receiving, at the WSE from a merchant, merchant information associated with the merchant, the merchant information including at least a merchant wallet account identifier and a merchant wallet identifier by which a merchant virtual wallet can be identified;
   generating, by the WSE, a merchant identifier by which the merchant is identified in the WSE;
   storing the merchant information and the merchant identifier within the database;
   registering, at the WSE, the merchant using the received merchant information and the merchant identifier;
   receiving, at the WSE, through a smartphone interface associated with the smartphone:
      a customer wallet identifier identifying a customer wallet associated with the at least one customer wallet provider, the customer wallet identifier associated with a payment vehicle including an available account balance, the customer wallet not being registered with the WSE;
      transaction details of a purchase transaction, the transaction details comprising:
         a transaction value; and
         a candidate merchant identifier of a candidate merchant with whom the purchase transaction is being made, the candidate merchant identifier manually or automatically inputted into at least one of an app and a web portal hosted by or associated with the candidate merchant; and
      a candidate merchant wallet identifier by which a candidate merchant virtual wallet can be identified, the candidate merchant virtual wallet being associated with the candidate merchant identifier;
verifying that the candidate merchant virtual wallet is registered with the WSE by matching i) the candidate merchant identifier to the stored merchant identifier and ii) the candidate merchant wallet identifier to the stored merchant wallet identifier;
authenticating, via the at least one customer wallet provider, the customer wallet identifier; and
upon i) verifying that the candidate merchant virtual wallet is registered and ii) authenticating the customer wallet identifier via the at least one customer wallet provider:
sending, from the payment vehicle to the WSE, a first amount that is less than or equal to the transaction value if the transaction value does not exceed the available account balance; and
sending, from the WSE to the candidate merchant virtual wallet, a second amount that is less than or equal to the first amount.

2. The method according to claim 1, wherein receiving comprises receiving a payment vehicle identifier, the transaction details, and the candidate merchant wallet identifier from an online payment portal.

3. The method according to claim 2, wherein the online payment portal is a merchant website or merchant app, and wherein receiving comprises receiving the payment vehicle identifier, transaction details, and the candidate merchant wallet identifier from the merchant website or merchant app.

4. The method according to claim 1, wherein sending, from the payment vehicle to the WSE, a first amount that is less than or equal to the transaction value comprises sending the first amount from the payment vehicle to a wallet settlement account associated with the payment vehicle.

5. The method according to claim 4, further comprising sending a third amount from the wallet settlement account associated with the customer wallet to a wallet settlement account associated with the candidate merchant virtual wallet, wherein the third amount is an amount equal to or less than the first amount and equal to or greater than the second amount.

6. The method according to claim 5, wherein sending, from the WSE to the candidate merchant virtual wallet, a second amount that is less than or equal to the first amount comprises sending the second amount from the wallet settlement account associated with the candidate merchant virtual wallet to the candidate merchant virtual wallet.

7. The method according to claim 4, further comprising creating the wallet settlement account associated with the payment vehicle in response to receiving a payment vehicle identifier associated with the payment vehicle.

8. The method according to claim 7, further comprising deleting the wallet settlement account associated with the payment vehicle after sending the third amount to the wallet settlement account associated with the candidate merchant virtual wallet.

9. The method according to claim 4, further comprising creating the wallet settlement account associated with the candidate merchant virtual wallet in response to receiving the merchant wallet identifier.

10. The method according to claim 9, further comprising deleting the wallet settlement account associated with the candidate merchant virtual wallet after sending the second amount to the candidate merchant virtual wallet.

11. The method according to claim 2, wherein the customer wallet comprises the payment vehicle, and wherein the payment vehicle identifier comprises the customer wallet identifier by which the customer wallet can be identified.

12. The method according to claim 1, further comprising:
receiving, via at least one of a webpage, a portal and a computer application, a unique code from a merchant smartphone associated with the merchant;
forwarding the unique code to a merchant virtual wallet provider associated with the merchant wallet identifier; and
in response to matching the unique code to a stored unique code, receiving a validation of the merchant from the merchant virtual wallet provider.

13. The method according to claim 1, wherein generating, by the WSE, the merchant identifier further comprises generating the merchant identifier upon receiving a validation of the merchant from a merchant virtual wallet provider.

14. The method according to claim 1, further comprising sending, via at least one of a short message service (SMS) and an email, the generated merchant identifier to the merchant.

15. A computer system for managing funds transferal, the computer system comprising:
a wallet settlement engine (WSE) in communication with at least one customer wallet provider associated with a customer and a smartphone associated with the customer, the WSE comprising:
a memory device for storing data;
a display; and
a processor coupled to the memory device, wherein the processor is configured to:
receive, from a merchant, merchant information associated with the merchant, the merchant information including at least a merchant wallet account identifier and a merchant wallet identifier by which a merchant virtual wallet can be identified;
generate a merchant identifier by which the merchant is identified in the WSE;
store the merchant information and the merchant identifier within the memory device;
register, at the WSE, the merchant using the received merchant information and the merchant identifier;
receive a payment vehicle identifier by which a payment vehicle can be identified, wherein the payment vehicle includes an available account balance;
receive, through a smartphone interface associated with the smartphone, a customer wallet identifier identifying a customer wallet of the customer, the customer wallet identifier associated with a payment vehicle including an available account balance, the customer not being registered with the WSE;
receive, through the smartphone interface, transaction details of a purchase transaction, the transaction details including:
a transaction value; and
a candidate merchant identifier of a candidate merchant with whom the purchase transaction is being made, the candidate merchant identifier manually or automatically inputted into at least one of an app and a web portal hosted by or associated with the candidate merchant; and
receive a candidate merchant wallet identifier by which a candidate merchant virtual wallet can be identified, the candidate merchant virtual wallet associated with the candidate merchant identifier;

verify that the candidate merchant virtual wallet is registered with the WSE by matching i) the candidate merchant identifier to the stored merchant identifier and ii) the candidate merchant wallet identifier to the stored merchant wallet identifier;

authenticate, via the at least one customer wallet provider, the customer wallet identifier; and upon i) verifying that the candidate merchant virtual wallet is registered and ii) authenticating the customer wallet identifier via the at least one customer wallet provider:

receive, from the payment vehicle, a first amount that is less than or equal to the transaction value if the transaction value does not exceed the available account balance; and send a second amount to the candidate merchant virtual wallet, wherein the second amount is less than or equal to the first amount.

16. The computer system according to claim 15, wherein the processor is further configured to receive the payment vehicle identifier, the transaction details, and the candidate merchant wallet identifier from an online payment portal.

17. The computer system according to claim 16, wherein the processor is further configured to receive the payment vehicle identifier, the transaction details, and the candidate merchant wallet identifier from at least one of a merchant website and a merchant app.

18. The computer system according to claim 15, wherein the processor is further configured to:

receive, via at least one of a webpage, a portal and a computer application, a unique code from a merchant smartphone associated with the merchant;

forward the unique code to a merchant virtual wallet provider associated with the merchant wallet identifier; and in response to matching the unique code to a stored unique code, receive a validation of the merchant from the merchant virtual wallet provider.

19. The computer system according to claim 15, wherein the processor is further configured to generate the merchant identifier upon receiving a validation of the merchant from a merchant virtual wallet provider.

20. The computer system according to claim 15, wherein the processor is further configured to send, via at least one of a short message service (SMS) and an email, the generated merchant identifier to the merchant.

* * * * *